US009602874B2

(12) United States Patent
Wendling

(10) Patent No.: US 9,602,874 B2
(45) Date of Patent: Mar. 21, 2017

(54) METHOD FOR SECURE TRANSFER OF MESSAGES

(75) Inventor: Bertrand Wendling, Rolle (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 381 days.

(21) Appl. No.: 13/175,329

(22) Filed: Jul. 1, 2011

(65) Prior Publication Data

US 2012/0008779 A1    Jan. 12, 2012

(30) Foreign Application Priority Data

Jul. 9, 2010 (EP) ..................................... 10169111

(51) Int. Cl.
| | | |
|---|---|---|
| *H04N 21/4367* | (2011.01) | |
| *H04N 21/4623* | (2011.01) | |
| *H04N 21/266* | (2011.01) | |
| *H04N 21/418* | (2011.01) | |
| *H04N 21/6543* | (2011.01) | |
| *H04N 21/658* | (2011.01) | |

(52) U.S. Cl.
CPC ... *H04N 21/4623* (2013.01); *H04N 21/26606* (2013.01); *H04N 21/4181* (2013.01); *H04N 21/4367* (2013.01); *H04N 21/658* (2013.01); *H04N 21/6543* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,070,246 | A * | 5/2000 | Beser ................................ | 726/2 |
| 6,490,645 | B1 | 12/2002 | Shahaf et al. | |
| 7,441,041 | B2 | 10/2008 | Williams et al. | |
| 7,480,803 | B1 * | 1/2009 | Marballi ....................... | 713/178 |
| 7,707,276 | B2 * | 4/2010 | Brenes et al. ................ | 709/220 |
| 7,783,776 | B2 | 8/2010 | Nimour | |
| 8,006,300 | B2 * | 8/2011 | Mizrah ........................... | 726/20 |
| 8,055,259 | B1 * | 11/2011 | Sigg ....................... | H04M 15/50 |
| | | | | 379/112.01 |

(Continued)

FOREIGN PATENT DOCUMENTS

| | | |
|---|---|---|
| EP | 1 441 525 | 7/2004 |
| EP | 1 346 522 | 9/2004 |

(Continued)

OTHER PUBLICATIONS

International Search Report issued in International Application No. PCT/EP2006/050454, mailed Apr. 3, 2006.

(Continued)

*Primary Examiner* — Taghi Arani
*Assistant Examiner* — Phy Anh Vu
(74) *Attorney, Agent, or Firm* — DLA Piper LLP (US)

(57) ABSTRACT

The present invention may be deployed in a system for broadcast of conditional access content where it is desirable to detect and take action against receiver equipment which has been used in a control word sharing activity. By requiring that receiver equipment used in the system send a message to a broadcaster of conditional access content at a precise time, the invention provides a method for the server to detect receiver equipment involved in control word sharing activity and to inhibit that receiver's ability to further access the content.

12 Claims, 1 Drawing Sheet

(56) References Cited

U.S. PATENT DOCUMENTS

| | | | |
|---|---|---|---|
| 2002/0018459 A1* | 2/2002 | Desblancs | H04B 7/269 370/350 |
| 2002/0196920 A1* | 12/2002 | Golan | 379/201.01 |
| 2003/0023853 A1* | 1/2003 | Wajs | H04N 7/1675 713/178 |
| 2004/0030932 A1* | 2/2004 | Juels et al. | 713/202 |
| 2004/0064699 A1* | 4/2004 | Hooker et al. | 713/170 |
| 2004/0083364 A1* | 4/2004 | Andreaux et al. | 713/165 |
| 2005/0129234 A1 | 6/2005 | Duval | |
| 2005/0160265 A1* | 7/2005 | Tanaka et al. | 713/168 |
| 2005/0182931 A1* | 8/2005 | Robert et al. | 713/168 |
| 2005/0287991 A1* | 12/2005 | Shima | 455/411 |
| 2006/0005033 A1* | 1/2006 | Wood | 713/182 |
| 2006/0085828 A1* | 4/2006 | Dureau | H04N 5/4401 725/100 |
| 2006/0126838 A1 | 6/2006 | Taieb et al. | |
| 2006/0146862 A1* | 7/2006 | Lee | 370/448 |
| 2006/0277419 A1* | 12/2006 | McNulty et al. | 713/193 |
| 2007/0107065 A1* | 5/2007 | Asaumi | 726/28 |
| 2008/0144822 A1* | 6/2008 | Wendling et al. | 380/239 |
| 2008/0184345 A1* | 7/2008 | Kaechi | 726/5 |
| 2008/0209232 A1 | 8/2008 | Kudelski et al. | |
| 2009/0016527 A1* | 1/2009 | Vigarie et al. | 380/259 |
| 2009/0190757 A1* | 7/2009 | Chen | H04N 7/1675 380/242 |
| 2011/0007901 A1* | 1/2011 | Ikeda et al. | 380/270 |
| 2013/0303204 A1* | 11/2013 | Dudley | H04W 12/12 455/466 |

FOREIGN PATENT DOCUMENTS

| | | |
|---|---|---|
| WO | WO 2004/100590 | 11/2004 |
| WO | WO 2006/061837 | 6/2006 |

OTHER PUBLICATIONS

U.S. Appl. No. 11/814,993.
European Search Report issued in EP 10 16 9111, dated Jan. 14, 2011.

* cited by examiner

METHOD FOR SECURE TRANSFER OF MESSAGES

CROSS-REFERENCE TO RELATED APPLICATIONS

This application claims priority under 35 U.S.C. Section 119 to European Patent Application Number EP10169111.1, entitled "A METHOD FOR SECURE TRANSFER OF MESSAGES", filed on Jul. 9, 2010, the contents of which are hereby incorporated by reference herein.

INTRODUCTION

The present invention relates to the domain of conditional access systems and more particularly to methods for securing the transfer of secret keys for decrypting encrypted data.

STATE OF THE ART

In technical domains such as digital television broadcast, audio and/or video distribution and the like, where content of value is to be delivered to a plurality of points of use, conditional access systems are generally employed to ensure that the content can only be accessed at those points of use which are deemed to be legitimate points of use and not at any other point. By legitimate point of use it is usually taken to mean on a piece of equipment which is authorised to receive and consume such content, usually by the payment of a subscription to the owner of the content.

Indeed in the domain of pay-TV for example, content is usually encrypted under control words before being broadcast to a plurality of potential viewers. The control words are also broadcast in encrypted form in security messages along with the encrypted content. Thanks to the conditional access systems commonly used throughout the industry, only those viewers who are in possession of an appropriate decoder and who have paid for the rights to view the encrypted content will be allowed to have access to the control words thus allowing them to decrypt the encrypted content.

State of the art conditional access systems allowing for encrypted content to be broadcast to a plurality of receivers equipped with security modules generally involve the following principles. Content is encrypted by an operator under control words at a head end. The control words are encrypted under a transport key to make security messages known as entitlement control messages (ECM). The encrypted content and the ECMs are broadcast in a data stream to a plurality of receivers. The receivers filter the data stream to extract the ECMs and the encrypted content. The receivers' security modules have access to the transport key or an equivalent key to be able to extract the control words received in the ECMs. However, before being allowed to decrypt an ECM a check is made to verify that the security module actually has the necessary rights to be able to decrypt the content. These rights are usually obtained upon payment of a fee. Once a fee has been paid, the rights are loaded directly into a security module via another type of security message known as Entitlement Management Messages (EMM). These messages can be received either on the broadcast channel along with the content or via another channel. This second type of security message is addressable to one or a group of security modules. We can see then that the broadcast of conditional access content is done therefore in three parts: the encryption of content under control words, the encryption of the control words to form ECMs—decryptable by security modules having the necessary rights and thirdly the granting of rights and handling of such rights using addressable EMMs.

Security modules can be implemented in a variety of manners such as on a microprocessor card, on a smartcard or any electronic module in the form of a badge or key. These modules are generally portable and detachable from the receiver. The most commonly used form has electrical contacts but contactless versions of type ISO 14443 also exist. Another implementation of the security module exists where it is directly soldered inside the receiver, a variation of this being a circuit on a socket or connector such as a SIM module. Yet another implementation is to have the security module integrated on a chip which has another function e.g. on the de-scrambling module or on the microprocessor module of the decoder. The security module can also be implemented in software.

Operators have every interest in trying to prevent third parties from discovering the secret keys stored in a security module since their ability to generate revenue depends on the keys remaining secret. Furthermore, operators will see a dramatic fall in revenue should such keys be shared between colluding third parties on a large scale, such as is possible using a vast network like the internet for example or by cloning legitimate receivers/security modules to manufacture unauthorised receivers/security modules. The security of the keys is based on the fact that the security modules are tamperproof. However it is well known that leaks can happen from time to time. Whenever this happens it is necessary to change the keys used for encrypting the control words, but this would mean having to change all of the security modules or at least to be able to securely deliver new keys to the security modules.

In a similar domain, United States Patent Application publication number US 2009/0016527 A1 describes a method for authenticating a receiving device by a transmitting device whereby the transmitting device transmits a random number to the receiving device; the receiving device signs it with a private key from a pair of asymmetric keys and sends the signed random number back to the transmitter; the transmitter then decrypts the signed random number using the receiver's public key; if the result compares with the original random number, then the receiver is authenticated. The invention described does not make use of counters.

International Patent Application publication number WO 2006/061837 A2 discloses a method for setting up a secure communication link between two or more devices. The aim here is not so much the authentication of devices involved in the communication but rather the setting up of an encrypted communication session with a particular device once it has been detected. Following detection of a second device by a first device, the second device sends the first device a data string associated with the second device and corresponding to an operational parameter of the second device—for example a unique identification string. This data string is sent over a first communication channel. A second communication channel is then set up between the two devices and data is transmitted between the two devices in a manner which is configured according to the received data string, thereby making the second channel a secure channel.

European Patent Application publication number EP 1 441 525 A1 describes a system for receiving broadcast pay TV services, the system comprising a master terminal and a slave terminal linked to the master terminal. The slave terminal can access protected data received by the master terminal only if the master terminal can send specific data necessary for decrypting the protected data to the slave terminal within a predetermined time deadline. In this case the predetermined deadline is neither associated with nor corresponds to a particular slave terminal. Rather, the deadline is based upon the time that a message would take to travel from the master to the slave given that valid slaves should be located in close proximity to the master. In other words, depending on the predetermined deadline, it can be arranged that terminals which are sufficiently far from the master will not receive the specific data in time. This is useful for instance in a domain where a client is authorised to decrypt data on a plurality of machines within one premises for a preferential tariff. A higher tariff would be applied should the plurality of machines be spread over a plurality of remote locations. Using this technique assurances can be given that a user who has benefited from a preferential tariff does not try to decrypt the protected data on a remote machine by configuring his system to disallow access by machines which are in remote locations from the master device.

United States Patent Application publication number US 2008/0209232 A1 discloses a means for detecting when a security module is involved in control word sharing. The document describes the use of time stamps along with the control words. Each time a control word is passed from the security module to the decoder (or to a plurality of decoders in the case where control word sharing is going on) a calculation of time difference between the successive time stamps is made. If the result of this calculation is consistently below the normal crypto period for many times in succession, then it is an indication that the security module is performing control word sharing.

BRIEF SUMMARY OF THE INVENTION

The present invention provides a method for securely transferring content encrypted under control words from a server towards a receiver via a broadcast communication channel, said receiver comprising a security module, a decryption unit and a slave time counter, said server comprising a reference time counter, said security module and said server being mutually connected via a return communication channel, said method comprising the following steps:
  encrypting, by the server, the control words using key information;
  broadcasting the encrypted content and the encrypted control words on the broadcast communication channel from the server towards the receiver;
  defining, by the server, a pre-determined calling time and a calling time window said calling time and calling window corresponding to the receiver;
  monitoring, by the security module, a slave time indicated by the slave time counter;
  sending at least one verification message from the security module towards the server via the return communication channel when the slave time is equal to a slave calling time, said slave calling time being derived by the security module based on at least one defining parameter present within the security module;
  receiving the verification message by the server at a reference time indicated by the reference time counter;
  performing a verification, by the server, said verification at least determining whether or not a difference between the reference time and the pre-determined calling time is within the calling time window;
  in the case of a positive verification:
    sending a key message via the return communication path from the server towards the security module said key message comprising the key information;
    extracting, by the security module, the key information from the key message;
    decrypting, by the security module, the encrypted control words using the key information;
    decrypting, by the decryption unit, the encrypted content using the control words.

By requiring that a security module send a request to the server within a very specific timeframe in order to be able to receive the necessary keys for decrypting the control words, the method ensures that only legitimate security modules, which have the necessary means to initiate such a request, will be able to access the encrypted content. The method does not have a negative effect on useable broadcast bandwidth and can be easily implemented without requiring a change in users' equipment or performing unwieldy key updates in users' equipment. Furthermore, the method allows for swift and targeted punitive action to be taken against users of security modules which have been used in control word sharing activity.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

There is a need to provide more security in conditional access systems where decryption keys are stored in a security module. Given the ease with which information can be shared across the internet nowadays, the discovery of transport keys for example, by unscrupulous third parties, could mean that a large number of users of unauthorised equipment may acquire the possibility to decrypt ECMs and therefore decrypt encrypted content without paying for the rights to do so, thus depriving the owner of the encrypted content from revenue to which he would otherwise be entitled.

The present invention therefore aims to provide a means to securely transfer secret keys, such as transport keys for example, to security modules who can prove that they are entitled to receive them rather than building the security modules with the security keys already loaded. This also allows for an operator to quickly and easily modify the keys used to encrypt ECMs for example safe in the knowledge that authorised security modules will be able to follow such modifications and therefore continue being able to decrypt the encrypted content to which they are entitled.

The present invention may be deployed within a conditional access system such as is commonly used in the domain of pay-TV for example. As well as providing a means for an operator to detect unauthorised receiver equipment, it further provides a means for taking punitive action against users of such equipment. The method provided by the invention does not have a negative effect on the broadcast bandwidth and allows for an operator to be able to quickly and efficiently change encryption keys without penalising users of authorised equipment.

Figure 1:
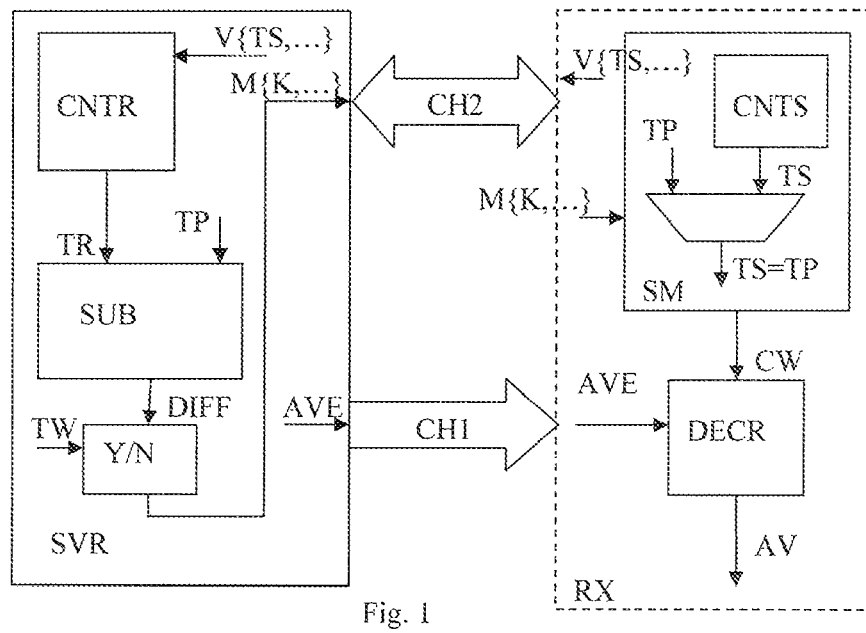
FIG. 1 showing a block diagram of a system in which an embodiment of the present invention may be deployed.

FIG. 1 shows a block diagram of a system in which an embodiment of the present invention may be deployed. The operator broadcasts content (AV) encrypted (AVE) under control words (CW) from a head end or server (SVR) to a plurality of receivers (RX) via a broadcast communication channel (CH1). In the manner which is well known in the field of conditional access digital broadcast, the server (SVR) also broadcasts security messages (ECM) along with the encrypted content (AVE) to allow receivers who have the necessary keys to extract the control words (CW). The server (SVR) comprises a reference time counter (CNTR) which is used to keep track of time. The time indicated by the reference time counter is known as the reference time (TR).

The system comprises a plurality of receivers, one of which is indicated in FIG. 1 (RX). The receiver (RX) comprises a security module (SM) and a decryption module (DECR). The decryption module (DECR) is configured to decrypt incoming encrypted content (AVE) using control words (CW) which it receives in encrypted form (ECM) from the security module (SM). The system further comprises a server or head-end (SVR), which broadcasts content encrypted (AVE) under key information (K) to the plurality of receivers via a broadcast communication channel (CH1) as well as the encrypted control words (ECM). Each receiver (RX) is also connected to the server (SVR) via a bi-directional back-channel or return communication path (CH2). In order for a receiver (RX) to receive a message allowing it to extract the key information (K) to decrypt the control words (CW), it has to first send a verification message (V) to the server (SVR) so that the server (SVR) can check whether or not it is a valid receiver (RX). If the server (SVR) decides that the receiver (RX) is a legitimate one, then it sends a key message (M) back to the receiver (RX) via the return communication channel (CH2) and using its security module (SM), the receiver extracts the necessary key information (K) to be used to reveal the control words (CW) contained in the security messages (ECM) and therefore to decrypt the encrypted content (AVE).

It should be appreciated that the return communication path could be any bi-directional communication channel, independent from the broadcast communication channel, such as the internet for example. The return communication path could be realised using readily available WiFi, ADSL or GSM/3G technological means.

The verification procedure used by the server (SVR) is based on the receiver (RX) sending its verification message (V) at a particular time. Indeed, for a positive verification, the receiver (RX) needs to send its verification message (V) at a pre-determined calling time (TP). Practically speaking however, because of latencies within the system, the message (V) may not be received exactly at the pre-determined calling time (TP). Therefore, according to one embodiment of the present invention, a window, known as the calling time window (TW), is defined around the pre-determined calling time (TP) and for a positive verification the message (V) has to arrive within this window (TW).

As described above, following a positive verification, the server (SVR) sends the key message (M) comprising the key information (K) for decrypting the control words (CW) back to the receiver (RX). On the other hand, in the case of a negative verification, the server (SVR) may reply to the receiver (RX) by sending inhibit key information (X) in the key message (M) via the return communication channel (CH2), thus blocking the receiver (RX) from decrypting the broadcast at least for a short period of time, otherwise known as a pre-determined exclusion period (EX). If the receiver (RX) again tries to respond to the server (SVR) and again does so at the wrong time or outwith the expected timeframe, then the server (SVR) can send a further blocking message blocking the decryption for a longer time period and so on until eventually the receiver (RX) is permanently excluded from being able to decrypt broadcasts.

It is worth mentioning at this point that in the case of a negative verification it is also possible that the server (SVR) does not send any reply at all to the receiver (RX). In this case, rather than obtaining a key which may actively block the ability to decrypt further parts of the broadcast the receiver will be able to continue to use whatever key information it was using to decrypt control words until that key information expires or until a particular right has expired. After this time the receiver is no longer able to decrypt the control words. Until this time however, the receiver may have a further opportunity to perform the challenge of sending a verification message at the correct time.

According to the embodiment of the invention described, the server (SVR) comprises a reference counter (CNTR) with which it keeps track of a reference time (TR). The server is thus able to check at what reference time (TR) a receiver (RX) sends its verification message (V). The receiver (RX) comprises a slave counter (CNTRS) which it uses to keep track of a slave time (TS) and it has knowledge of the pre-determined calling time (TP). Comparing the slave time (TS) with the pre-determined calling time (TP), the receiver (RX) thus knows when to send the verification message (V) to the server (SVR). Preferably the slave counter (CNTS) is comprised within the security module (SM) and the security module. (SM) undertakes the comparison of the slave time (TS) with the pre-determined calling time (TP) and sends the message (V) to the server (SVR).

According to different embodiments of the present invention, the receiver (RX) gains knowledge of the pre-determined calling time (TP) through communications received from the server (SVR), which is responsible for defining the value (TP). The value (TP) is usually passed in encrypted format. This can be achieved either via the broadcast communication channel (CH1) by including the value (TP) in the security messages (ECM), which are broadcast along with the encrypted content (AVE) as described above. Otherwise, the encrypted pre-determined calling time (TP) can be passed via another type of security message known as entitlement management messages (EMM), also generally known within the field of conditional access digital broadcasting. These messages (EMM) may be sent by the server (SVR) on the broadcast communication channel (CH1) along with the encrypted content (AVE) and are usually addressable in that they are destined for at least a reduced subset of the totality of the plurality of security modules (SM) (receivers) and may even be addressable on a security module by security module basis. Alternatively the return communication channel (CH2) could be to communicate the pre-determined calling time (TP) to individual security modules (SM) (receivers). Another possibility is for each security module (SM) to have a built-in pre-determined calling time (TP) or a value which can be used to derive the pre-determined calling time, which is known to the server (SVR), i.e. set at the factory. It is worth noting that even in the cases above, where the pre-determined calling time (TP) needs to be communicated from the server (SVR) to the receiver (RX), this may be done using a value from which the pre-determined calling time (TP) may be derived rather than the pre-determined calling time (TP) itself.

It is worth noting that embodiments of the present invention allow for different expected arrival times to be pre-determined for different security modules. The server has means for keeping track of which expected arrival time applies to which security module. This means may involve the use of a table to record times against security modules, preferably using either unique addresses or some other unique identifying parameter to reference a security module. It follows then that upon reception of a verification message, the server has to be able to check which security sent it. Naturally, the verification message will further comprise the security module's unique address or some other unique identifying parameter associated with the security module. Otherwise a mathematical calculation could be used where the security module and the server are able to calculate a pre-determined calling time using a seed combined with a unique identifying parameter or a physical or measured parameter pertaining to the security module.

Synchronizing of the slave counter (CNTS) with the reference counter (CNTR) can be achieved by the server (SVR) updating the reference counter (CNTR) in the security module (SM) with the current value of its reference counter (CNTR) through the use of ECMs or EMMs via either the broadcast communication channel (CH1) or through the use of dedicated messages via the return communication channel (CH2).

In another embodiment of the present invention, instead of having a calling time window (TW), the receiver (RX) may be expected simply to prove that it had knowledge of the time that it was expected to reply by for example including the slave time (TS) in the verification message (V). For example, when the slave counter (CNTS) reaches the slave calling time (TC), the current slave time (TS) could be included in the verification message (V), possibly in encrypted form. In this case, the server (SVR) just needs to check whether the slave time (TS) corresponds to the pre-determined calling time (TP) or not.

Figure 2:
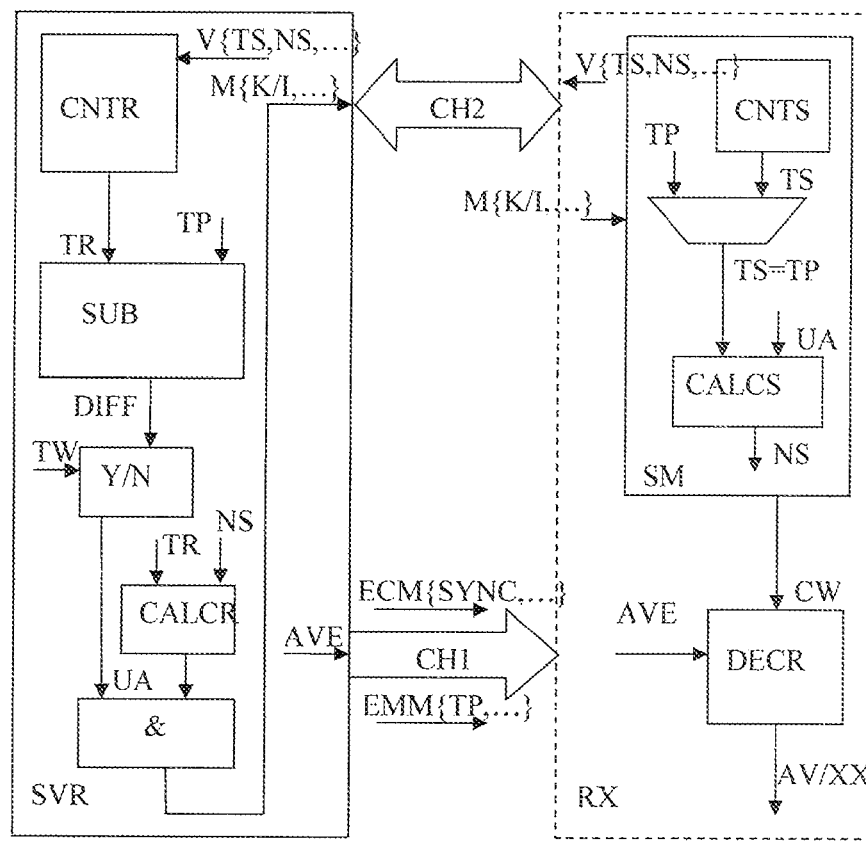
FIG. 2 showing a block diagram of a system in which a further embodiment of the present invention may be deployed.

Yet another embodiment of the present invention is illustrated in FIG. 2. In this embodiment, the receiver (RX) is expected to send the verification message (V) to the server at the pre-determined calling time (TP) but the message (V) also has to include a first pseudo-random number (NS), which can also be verified by the server (SVR). The first pseudo-random number (NS) may be a number generated in the security module (SM) from a seed previously received from the server (SVR). The security module (SM) thus further comprises a number generator (CALCS) in order to calculate the first pseudo-random number (NS). Any of the methods mentioned above for sending the pre-determined calling time (TP), for example via ECM or EMM, could also be used for sending the seed to the security module (SM). The server (SVR) also comprises means (CALCR) for calculating a pseudo-random number and therefore can generate a second pseudo-random number (NR) which it uses to verify the first pseudo-random number (NS) received from the security module (SM).

Rather than using a seed from the server (SVR) to generate the first pseudo-random number (NS), the security module (SM) may use a value of some defining parameter (UA) which allows the server (SVR) to identify a particular security module (SM) or group of security modules. Such defining parameters (UA) could be the security module's unique identifier or the value of a secure register or a physical parameter such as a voltage at some point within the security module (SM) or a frequency measured somewhere on the security module (SM). Another example of a defining parameter is an IP address. It follows then that the verification message sent from the security module to the server will comprise this defining parameter (UA) to allow the server to determine from where the verification message originated.

The present invention thus provides a secure means for broadcasting encrypted content from a server towards a receiver. The method used by the invention requires that a receiver send a verification message to the server at a particular and precise and verifiable time. In order to achieve this, the receiver must have access to a valid slave counter which can be synchronised with a reference counter in the server. A variation of the method further requires that a receiver include a pseudo-random number in the verification message, which can be checked by the receiver.

The invention claimed is:

1. A method for securely transferring content encrypted under at least one control word from a server towards a receiver via a publicly accessible broadcast communication channel, said receiver comprising a security module associated with a unique identifying parameter, a decryption unit and a slave time counter, said server comprising a reference time counter, said security module and said server being mutually connected via a return communication channel, said method comprising:

establishing, by the server, the publicly accessible broadcast communication channel;

establishing, by the server, the return communication channel the return communication channel being a bidirectional channel independent from the publicly accessible broadcast communication channel: encrypting, by the server, the control word using key information;

broadcasting both the encrypted content and the encrypted control word on said publicly accessible broadcast communication channel from the server towards said receiver;

defining, by the server, a pre-determined calling time and a calling time window, said pre-determined calling time and calling time window both corresponding to said receiver;

monitoring, by the security module, a slave time indicated by the slave time counter; sending at least one verification message from the security module towards the server via the return communication channel when the slave time is equal to a slave calling time, said slave calling time being derived by the security module based on at least the unique identifying parameter;

receiving the verification message by the server at a reference time indicated by the reference time counter;

performing a verification, by the server, said verification at least determining whether or not a difference between the reference time and the pre-determined calling time is within the calling time window; and wherein when the difference between the reference time and the pre-determined calling time is within the calling time window, said method further comprises:

sending a key message via the return communication channel from the server towards the security module, said key message comprising the key information;

extracting, by the security module, the key information from the key message;

decrypting, by the security module, the encrypted control word using the key information; and decrypting, by the decryption unit, the encrypted content using the control word.

2. The method according to claim 1, wherein said verification message comprises the unique identifying parameter.

3. The method according to claim 1, wherein said method further comprises the steps of:
calculating, by the security module, a first pseudo-random number using at least the unique identifying parameter; and
calculating, by the server, a second pseudo-random number using at least the unique identifying parameter;
wherein said verification message includes the first pseudo-random number and said verification step further comprises looking for a match between value of the first pseudorandom number and value of the second pseudo-random number.

4. The method according to claim 1, wherein said slave time counter is synchronized with the reference time counter.

5. The method according to claim 4, wherein said synchronization is achieved via a synchronization message comprised in a security message transmitted from the server to the security module via the broadcast communication channel.

6. The method according to claim 1, wherein the pre-determined calling time is sent from the server to the security module via the return communication channel.

7. The method according to claim 1, wherein the pre-determined calling time is sent from the server to the security module in an addressable security message via the broadcast communication channel.

8. The method according to claim 1, wherein the return communication channel comprises an internet connection.

9. The method according to claim 1, wherein the pre-determined calling time is derived by the security module based on at least the unique identifying parameter.

10. A method for securely transferring content encrypted under at least one control word from a server towards a receiver via a publicly accessible broadcast communication channel, said receiver comprising a security module associated with a unique identifying parameter, a decryption unit and a slave time counter, said server comprising a reference time counter, said security module and said server being mutually connected via a return communication channel, said method comprising:
establishing, by the server, the publicly accessible broadcast communication channel;
establishing, by the server, the return communication channel, the return communication channel being a bidirectional channel independent from the publicly accessible broadcast communication channel;
encrypting, by the server, the control word using key information;
broadcasting both the encrypted content and the encrypted control word on said publicly accessible broadcast communication channel from the server towards said receiver;
defining, by the server, a pre-determined calling time and a calling time window, said pre-determined calling time and calling time window both corresponding to said receiver;
monitoring, by the security module, a slave time indicated by the slave time counter;
sending at least one verification message from the security module towards the server via the return communication channel when the slave time is equal to a slave calling time, said slave calling time being derived by the security module based on at least the unique identifying parameter;
receiving the verification message by the server at a reference time indicated by the reference time counter;
performing a verification, by the server, said verification at least determining whether or not a difference between the reference time and the pre-determined calling time is within the calling time window; and
wherein when the difference between the reference time and the pre-determined calling time is within the calling time window, said method further comprises:
sending a key message via the return communication channel from the server towards the security module, said key message comprising the key information;
extracting, by the security module, the key information from the key message;
decrypting, by the security module, the encrypted control word using the key information; and
decrypting, by the decryption unit, the encrypted content using the control word,
wherein the verification leads to a negative result and the following additional steps are carried out;
sending a key message via the return communication channel from the server towards the security module, said key message comprising inhibit key information to disallow the decryption of the encrypted content at least for a pre-determined exclusion period; and
extracting, by the security module, the inhibit key information from the key message.

11. The method according to claim 10, wherein said pre-determined exclusion period varies as a function of a number of times a negative verification occurs.

12. A method for securely transferring content encrypted under at least one control word from a server to a receiver via a publicly accessible broadcast communication channel, said server comprising a reference time counter, a transmitter, and an input device for receiving communications from a security module associated with said receiver, the security module being associated with a unique identifying parameter and comprising a slave counter for determining a slave calling time, the method comprising:
establishing, by the server, the publicly accessible broadcast communication channel;
establishing, by the server, a return communication channel between the server and the receiver, the return communication channel being a bidirectional channel independent from the publicly accessible broadcast communication channel;
encrypting, by the server, the control word using key information;
broadcasting both the encrypted content and the encrypted control word on said publicly accessible broadcast communication channel from the server to said receiver;
defining, by the server, a calling time and a calling time window, said calling time and calling window both corresponding to said receiver and being dependent upon the unique identifying parameter; receiving by the server a verification message from the security module sent at the slave calling time derived by the security module based on at least the unique identifying parameter;
determining by the server a reference time indicated by the reference time counter at which the verification message is received;

performing by the server a verification, said verification at least determining whether or not a difference between the reference time and the calling time is within the calling time window; and sending a key message via the return communication channel from the server towards the security module when the difference between the reference time and the pre-determined calling time is within the calling time window, said key message comprising the key information.

* * * * *